(12) United States Patent
Job

(10) Patent No.: US 6,546,589 B1
(45) Date of Patent: *Apr. 15, 2003

(54) FLEXIBLE UNITARY MATERIALS MOVER

(76) Inventor: Donald D. Job, 393 Beacon St., Lowell, MA (US) 01850

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/603,331

(22) Filed: Feb. 20, 1996

(51) Int. Cl.[7] .............................. A47L 1/06; A47L 13/11
(52) U.S. Cl. ........................................ 15/245; 15/143.1
(58) Field of Search ................................. 15/245, 245.1, 15/143.1

(56) References Cited

U.S. PATENT DOCUMENTS

| | | | |
|---|---|---|---|
| 1,192,910 A | * 8/1916 | Lawrence | 15/245 |
| 1,898,690 A | * 2/1933 | Schacht | 15/245 |
| 2,828,502 A | * 4/1958 | Tupper | 15/245 |
| 2,900,656 A | * 8/1959 | Tupper | 15/245 |
| 3,013,291 A | * 12/1961 | Matrick | 15/245 |
| 3,346,902 A | * 10/1967 | Leventhal | 15/143.1 |
| 4,097,951 A | * 7/1978 | Hurtt | 15/245.1 |
| 4,297,761 A | * 11/1981 | Loos | 15/245.1 |
| 4,495,668 A | * 1/1985 | Adams | 15/245 |
| 4,536,910 A | * 8/1985 | Clark | 15/245.1 |
| 4,970,749 A | * 11/1990 | Priore | 15/245.1 |
| 5,343,586 A | 9/1994 | Vosbikian | |
| 5,363,528 A | 11/1994 | Brock | |
| 5,458,060 A | 10/1995 | Casi | |
| D367,932 S | 3/1996 | Hansen | |
| 5,530,983 A | * 7/1996 | Maltese | 15/143.1 |

FOREIGN PATENT DOCUMENTS

| | | | | |
|---|---|---|---|---|
| AU | 30518 | * | 2/1932 | 15/245 |
| NL | 0049838 | * | 1/1941 | 15/143.1 |

\* cited by examiner

Primary Examiner—Randall E. Chin

(57) ABSTRACT

The present invention is directed to a flexible device for moving flowable materials including liquids, powders, pellets and the like. The invention has a thin edge of sufficient flexibility to conform to different surface irregularities and yet has sufficient stiffness to exert substantial force on the material being moved. An additional feature is an integral handle enabling ease of storage.

2 Claims, 5 Drawing Sheets

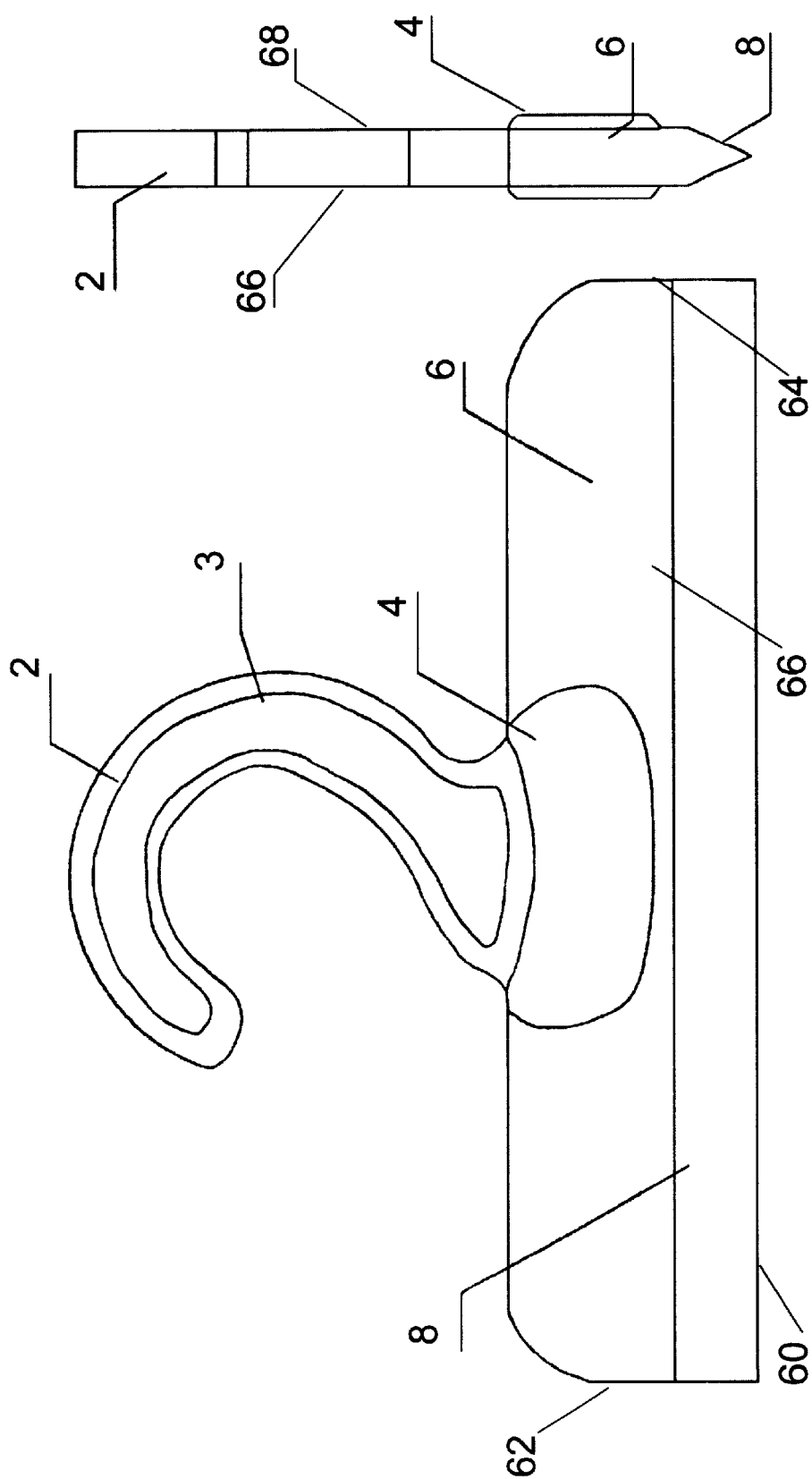

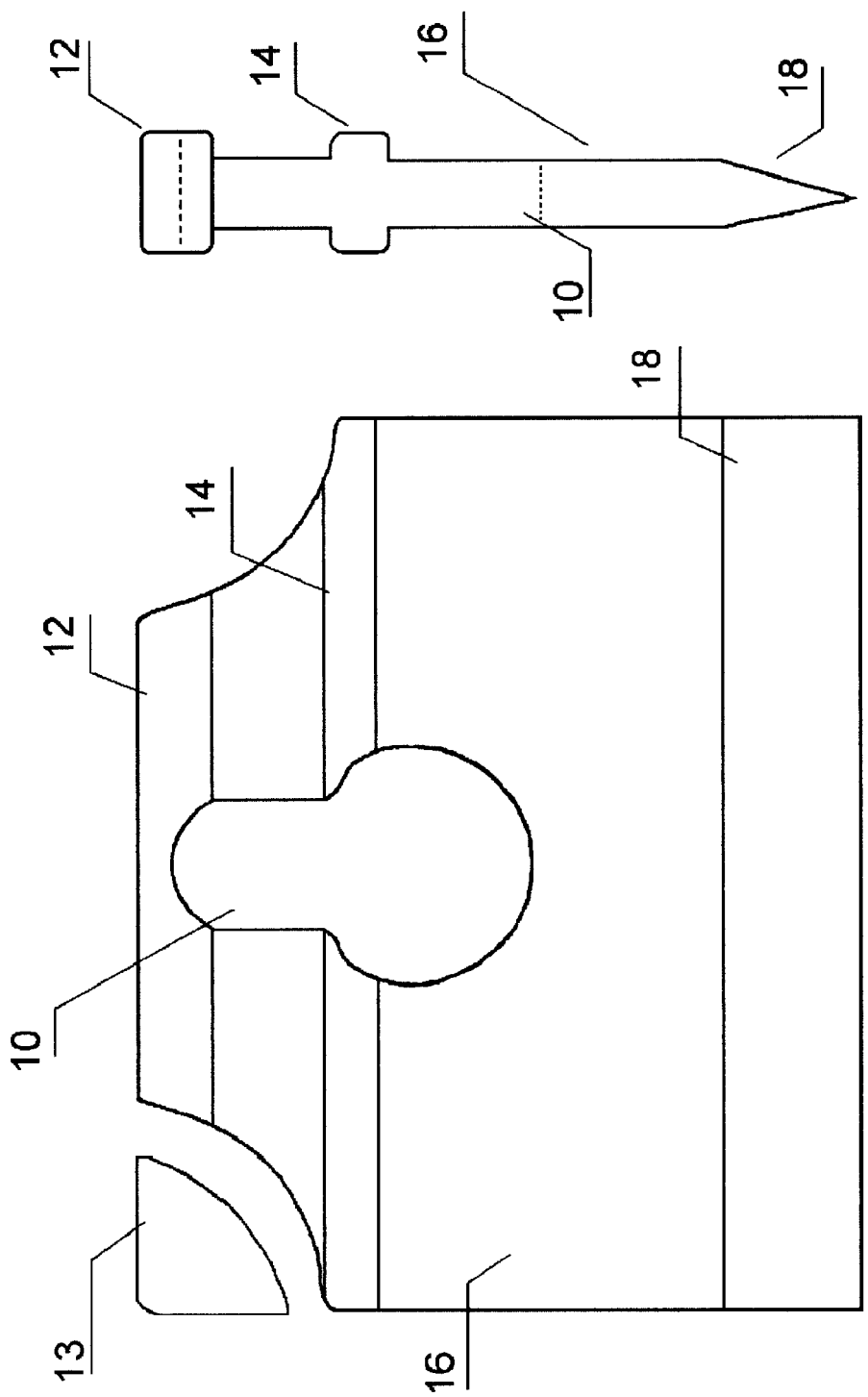

FLEXIBLE UNITARY MATERIALS MOVER

FIELD OF INVENTION

The present invention is directed to a flexible device for moving flowable materials.

BACKGROUND OF THE INVENTION

The concept of having a device with a flexible edge for moving fluids as in a squeegee is disclosed in U.S. Pat. No. 5,363,528, incorporated herein by reference, and U.S. Pat. No. 5,343,586.

Squeegee technology for screen printing is well documented in U.S. Pat. No. 5,458,060.

U.S. Pat. No. D367,932 discloses a squeegee having a handle offset from the blade holder.

Further, metal dough scrapers are known for handling dough, and flour in baking. Further, small rubber bowl scrapers are sold under the trademark RUBBERMAID.

Such scrapers have separate blade and handle sections. Typically the blade is inserted into a slot in the handle. Often the blade, especially when wet and slippery, slips in the slot. This results in either blade loss, exposure of a surface being scraped to hard material of the handle (which can scratch the surface), loose, less effective blades, or a portion of the blade extending beyond the handle being unsupported. The unsupported portion prevents getting into corners and can snag on objects. This arises from two conditions. The first is differential expansion between the hard, rigid material of the handle and the soft flexible material of the blade. The second is that the device is often used around water which acts as a lubricant on the blade material.

Further, liquids can get trapped between the blade and the holder breed bacteria and mold. Further, separate blade and handle sections increases the cost of manufacturing. Further, such scrapers lack, a means for hanging the squeegee in the shower, a place it is often used.

SUMMARY OF THE INVENTION

The present invention is directed to a flexible device for moving flowable, materials including liquids, dough, powders (including toner), pellets and the like. The device is a monolithic, scraper or squeegee having tapered or thinned edge sufficiently flexible to conform to surface irregularities and thickened sections such as ribs to provide sufficient stiffness to transfer substantial force against the surface and on the material being moved. An additional feature is an integral hanging means, preferably usable in a shower, to enable ease of convenient storage. Another optional feature is provision of a nubbed or textured surface on the handle to increase grip.

It is an object of the present invention to provide a useful device for moving flowable material as pellets, powders and the like along a surface.

A further object of the invention is to wipe liquids from a smooth surface.

An object of the invention is to provide a soft flexible edge which conforms to surface irregularities.

An object of the invention is to provide for convenient storage. A further object is to incorporate an opening sufficiently large to hang over a shower head.

Yet another object of the invention is to eliminate slippage of wet blade from a holding handle, thus reducing blade loss, ineffective wiping, scratched surfaces, missed corner wiping and snagging. A further object of the invention is to reduce or eliminate trapped water and the resultant bacteria and mold growth. The present invention provides a lightweight and flexible system which is easy to use and store.

In one embodiment of the invention, a suction cup is formed by the thickened strengthening sections.

These and other objects of the present invention will become more readily appreciated and understood from a consideration of the following detailed description of the preferred embodiments when taken together with the accompanying drawings.

A particular advantage is use of the present invention as a squeegee for removing moisture from mirrors and show stall walls.

BRIEF DESCRIPTION OF THE DRAWINGS

FIG. 1 is a side view of a preferred embodiment of the device.

FIG. 2 is an end view of the embodiment shown in FIG. 1.

FIG. 3 is a side view of a second preferred embodiment of the device.

FIG. 4 is an end view of the embodiment shown in FIG. 3.

DETAILED DESCRIPTION OF THE PREFERRED EMBODIMENT

Figure 5:
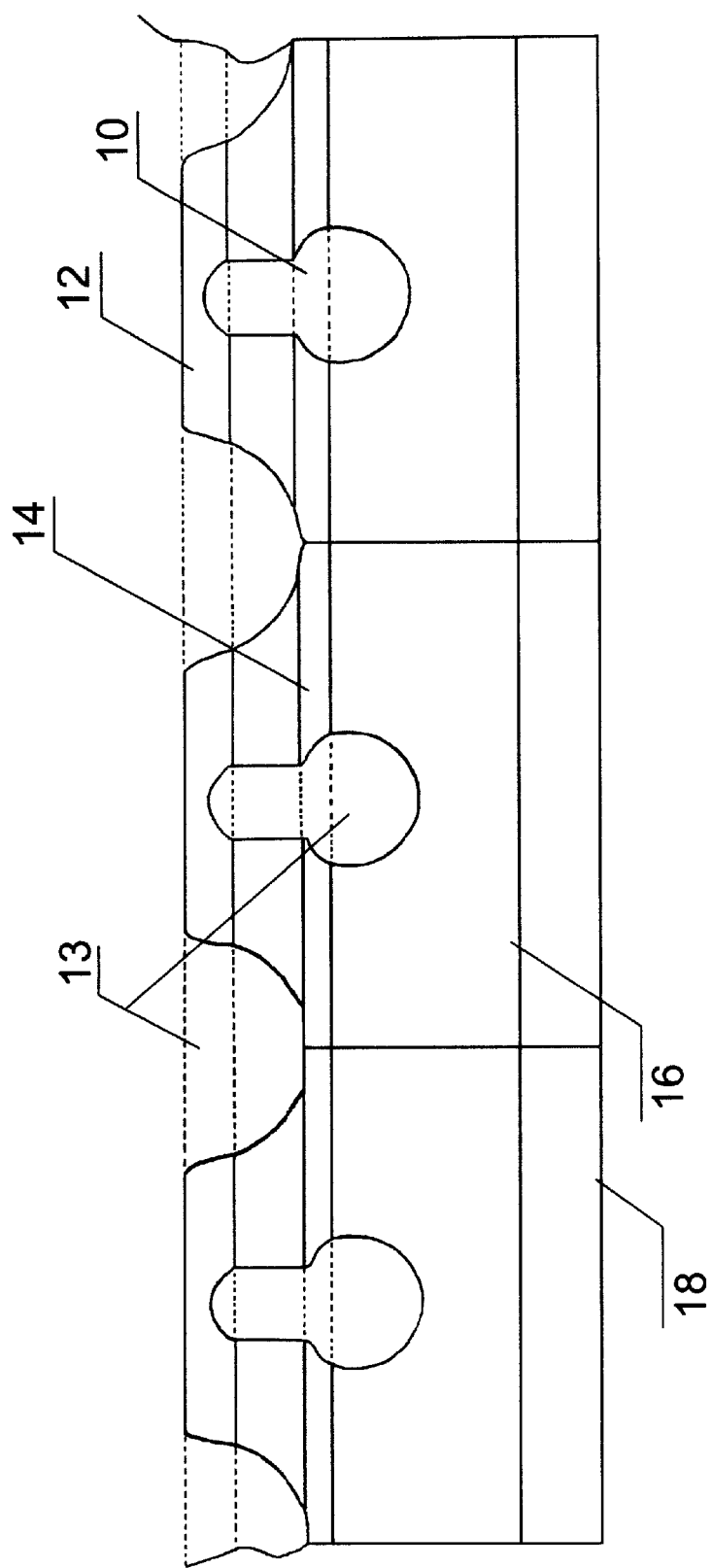
FIG. 5 is a side view of a production method for the embodiment of FIG. 3.

The present invention is a device which facilitates movement of liquids and flowable materials across a surface. The device can be used to remove water from mirrors and windows. Likewise, it can be used to remove water from tile and walls in shower stalls and tubs, which prevents buildup of deposited materials. It can be used in photographic laboratories to remove water from prints and negatives to reduce spotting and speed drying time. It can be used to spread printing materials for screen printing. It can be used to manipulate soft dough or to scrape bowls, depending on the shape of the thinned area of the device.

The device shown in FIGS. 1 and 2 is molded, grown or machined as a single monolithic device. At the of the device is a hook 2 which allows the device to be hung on the pipe feeding the shower head. Shown in the central portion of hook is a depressed area 3 which is one of the areas in which less material may be used to effect a cost reduction. The elongated body 6 has a thickened section 4 for reinforcement. This provides rigidity in the area of the handle and body so as to allow sufficient force, particularly when moving viscous or heavy materials. The blade 8 is formed by tapering the body 6 at the bottom to a thin, flexible edge. In the embodiment shown in FIGS. 1 and 2, at all points at a given height above said bottom 60, the shortest distance between the front 66 and back 68 of the device is less than the shortest distance between said two sides 62, 64.

Appropriate selection of material for formation of the device is important to the functionality of the invention. The handle requires a balance between rigidity, ruggedness, flexibility and formability. Formability can be moldability, machinability, extrudability, or growability (as in stereolithography). Our experience has been that a number of different, plastics, particularly thermoplastics and thermosetting plastics, rubbers and coated metals meet these requirements. Among these thermoplastics, such as ABS, nylon, polyethylene, and polystyrene having a durometer of 40 to 60 on the Shore A scale are preferred for molding.

The device shown in FIGS. 3 to 5 shows a second version of the invention suitable for production by first extruding material and then die cutting the extrusion. Extrusion produces a sheet having a top rib 12, a mid rib 14 and a tapered blade 18. Die cutting produces an opening 10, which is preferably large enough to be hung over a shower head. Waste 13 (shown in part in FIG. 3 and in completeness in FIG. 5) would preferably be recycled into the extrusion mixture. The ribs 12, 14 provide rigidity and a better grip.

Figure 7:
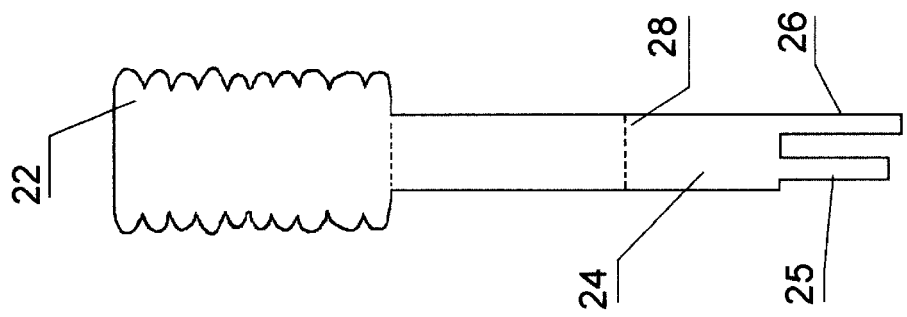
FIG. 7 is an end view of the embodiment of FIG. 6.
Figure 6:
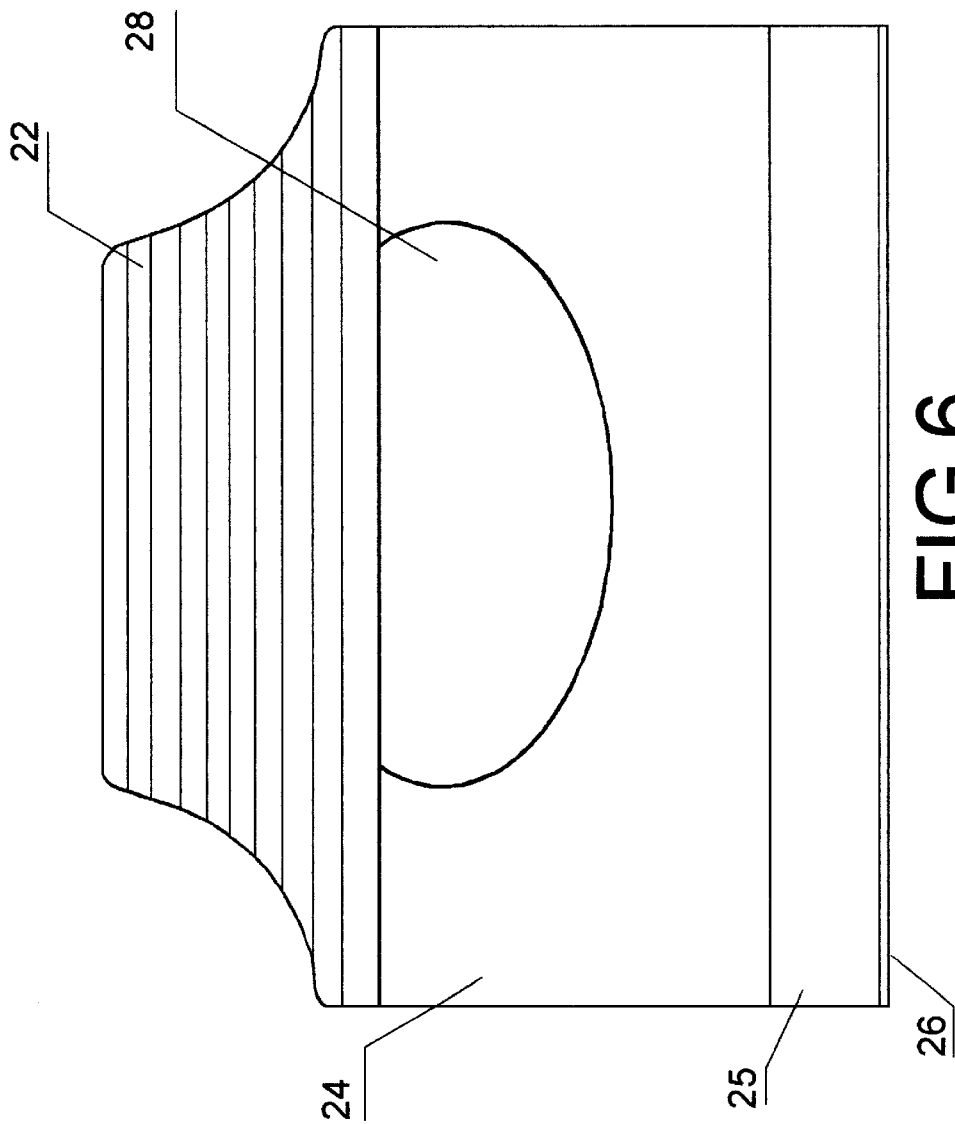
FIG. 6 is a side view of a third preferred embodiment of the device.

The device shown in FIGS. 6 and 7 has a thickened section 22 having small ribs on the surface to allow better grip. The body 24 of the device just below the thickened section 22 has an elongated opening 28 which allows fingers to reach around the thickened section 22 and also allows the device to be hung over a shower head or the like. Two blades 25 and 26 are formed as a thinned section of the body, somewhat different than the tapered section described in the previous embodiments. Of course the previously described embodiments could be modified to have a second tapered blade, or the present embodiment modified to have a single blade.

Figure 8:
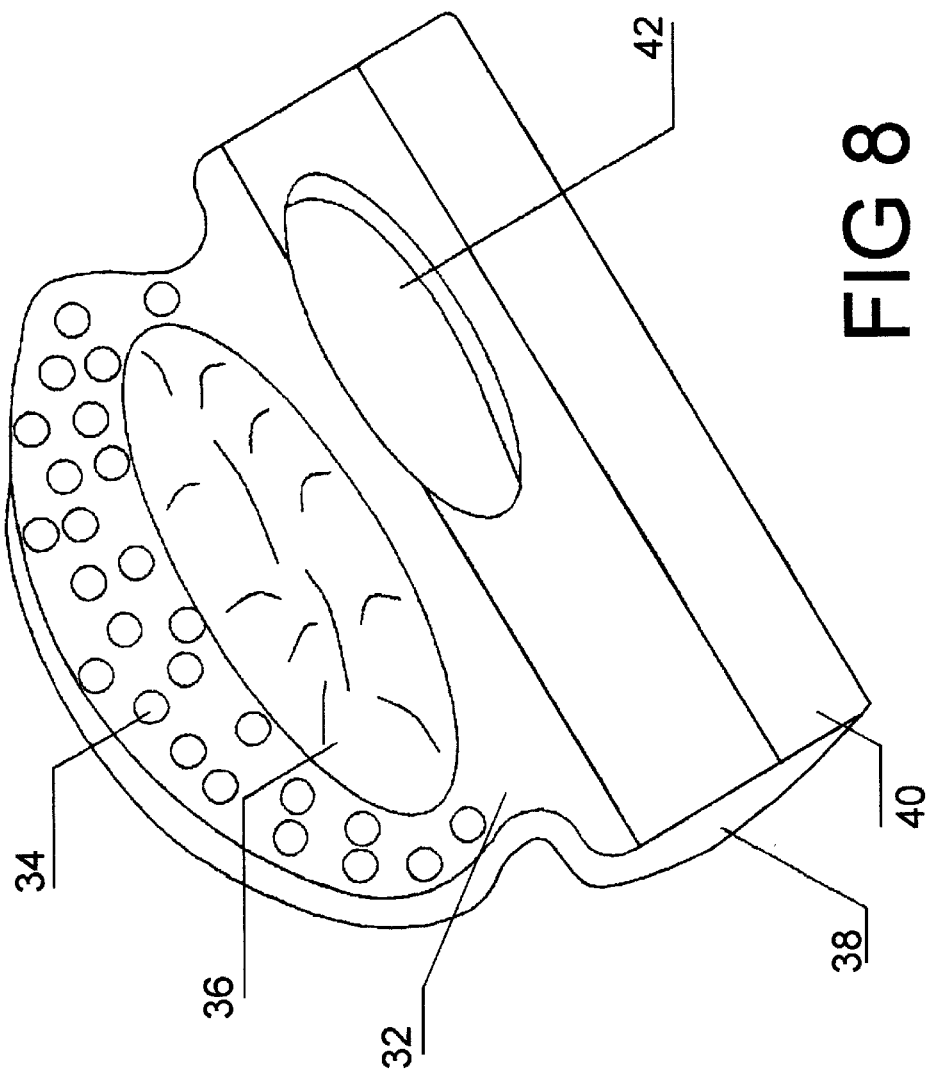
FIG. 8 is a perspective view of a fourth preferred embodiment of the invention.

The device shown in FIG. 8 makes use of the flexible nature of the elastomer to form an integral suction cup, which offers an alternative means for storing the device where a shower head is not handy, for example in a pool. The device has a thickened handle section 32 with small raised nubs 34 and a tapered depression 36. The depression 36 can be pressed against a flat surface with sufficient force to force extra air out. Then released, the suction will hold the device to the flat surface, ready for use. The main body 38 is provided with a tapered blade 40 and an opening for hanging 42.

If the device is to be used for moving materials in a curved surface such as a bowl, the devices of FIGS. 1, 3, 6, and 8 could be modified to have a blade having a rounded perimeter.

In choosing a material the use of the device should be considered. For example, when moving pellets, pills, and tablets, many materials will work. However, when moving chemically active materials, the device should be made of or coated with an inert or chemically resistant material. For powders the material would preferably be non-sticky under the conditions of use. Also, because powders and some solvents can be explosive, and using the device involves friction, incorporation of an anti-static such as an ammonium salt into the material is desirable.

Accordingly, the present invention is described with some degree of particularity directed to preferred embodiments of the present invention. It should be appreciated, though, that modifications and permutations of the presented embodiments may be made to preferred embodiments of the present invention without departing from inventive concepts contained herein.

I claim:

1. A monolithic device, being the same material throughout, said device comprising a body having a top and a bottom, two sides, a front and a back, wherein said bottom opposes said top, said body having a handle at said top and a flexible straight edge at said bottom, said handle being directly above said flexible straight edge, wherein said monolithic body further comprises at least one thickened section above and parallel to said flexible straight edge to provide rigidity, and wherein said handle further comprises a hook.

2. A monolithic device, being the same material throughout, said device comprising a body having a top and a bottom, two sides, a front and a back, wherein said bottom opposes said top, said body having a handle at said top and a flexible straight edge at said bottom, said handle being directly above said flexible straight edge, wherein said monolithic body further comprises at least one thickened section above and parallel to said flexible straight edge to provide rigidity, wherein said handle further comprises a hook, said hook and thickened section are sufficiently large so each may be used as a handle, so that the device may be held easily either parallel to or perpendicular to said flexible straight edge.

* * * * *